US 8,810,877 B2

(12) United States Patent
Tsunematsu et al.

(10) Patent No.: US 8,810,877 B2
(45) Date of Patent: Aug. 19, 2014

(54) IMAGE PROCESSING APPARATUS, IMAGE PROCESSING METHOD, AND STORAGE MEDIUM FOR ELIMINATING BLURRING OF SCANNED IMAGE

(75) Inventors: Yuuichi Tsunematsu, Kawasaki (JP); Xiaoyan Dai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 657 days.

(21) Appl. No.: 12/824,838

(22) Filed: Jun. 28, 2010

(65) Prior Publication Data

US 2011/0002018 A1 Jan. 6, 2011

(30) Foreign Application Priority Data

Jul. 1, 2009 (JP) .................. 2009-156974

(51) Int. Cl.
*H04N 1/46* (2006.01)
*H04N 1/40* (2006.01)
*H04N 1/64* (2006.01)
*G06T 7/00* (2006.01)
*G06T 7/40* (2006.01)
*H04N 1/58* (2006.01)

(52) U.S. Cl.
CPC ............. *H04N 1/58* (2013.01); *H04N 1/40062* (2013.01); *H04N 1/642* (2013.01); *G06T 7/0081* (2013.01); *G06T 7/408* (2013.01); *G06T 2207/10024* (2013.01); *G06T 2207/10008* (2013.01)
USPC ......................................... 358/532; 358/3.26

(58) Field of Classification Search
USPC ......... 358/1.1, 1.9, 3.26, 1.14, 500, 501, 530, 358/531, 532, 400, 401, 448, 463; 382/162, 382/164, 173, 180
See application file for complete search history.

(56) References Cited

U.S. PATENT DOCUMENTS

| 5,680,478 A | 10/1997 | Wang et al. | 382/176 |
| 5,757,961 A | 5/1998 | Yamakawa et al. | 382/197 |
| 7,623,712 B2 | 11/2009 | Dai et al. | 382/180 |
| 2006/0045386 A1 | 3/2006 | Fukuoka et al. | 382/305 |
| 2007/0025617 A1* | 2/2007 | Dai et al. | 382/180 |
| 2007/0086667 A1 | 4/2007 | Dai et al. | 382/242 |
| 2009/0274394 A1 | 11/2009 | Tsunematsu | 382/312 |
| 2010/0014752 A1 | 1/2010 | Ishigami et al. | 382/164 |
| 2010/0033745 A1 | 2/2010 | Dai et al. | 358/1.9 |

FOREIGN PATENT DOCUMENTS

| JP | 2885999 B2 | 4/1999 |
| JP | 2004-265384 | 9/2004 |
| JP | 2006-344069 | 12/2006 |
| JP | 2007-272457 A | 10/2007 |
| JP | 2007-335982 A | 12/2007 |

\* cited by examiner

*Primary Examiner* — Thomas D Lee
(74) *Attorney, Agent, or Firm* — Fitzpatrick, Cella, Harper & Scinto

(57) ABSTRACT

For the problem of blurring at a boundary in a scanned illustration, a method of separating and vectorizing color regions accurately is realized by identification of a labeled region corresponding to the blurring and combining processing with another neighboring region. An image input unit, a color region dividing unit dividing an input image into the color regions, a labeling unit providing an individual label to the color region, a labeled region shape analysis unit obtaining labeled region shape information including information representing a shape feature of a labeled region which is the color region provided with the label, a micro-region determination unit determining whether the labeled region provided with the label is a micro-region or not according to the labeled region shape information, and a micro-region combining unit combining the region determined to be the micro-region with a neighboring region, are comprised.

12 Claims, 10 Drawing Sheets

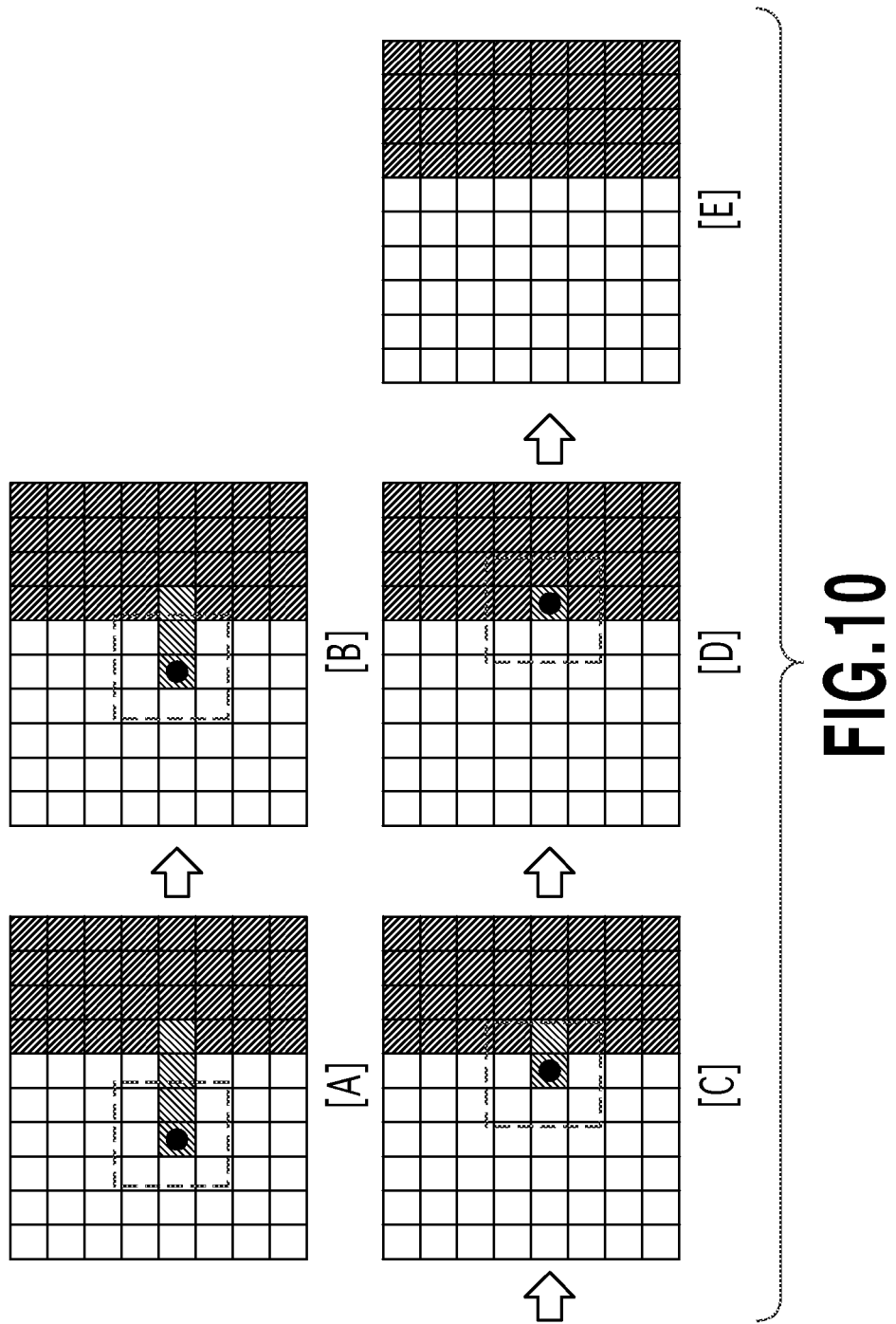

IMAGE PROCESSING APPARATUS, IMAGE PROCESSING METHOD, AND STORAGE MEDIUM FOR ELIMINATING BLURRING OF SCANNED IMAGE

BACKGROUND OF THE INVENTION

1. Field of the Invention

The present invention relates to an image processing technique. In more detail, the present invention relates to an image processing apparatus, an image processing method, a program, and a storage medium, for eliminating blurring in a boundary part of an illustration in a scanned image.

2. Description of the Related Art

Recently, the progress in information computerization has diffused a system which preserves a paper document by computerization with a scanner or the like without preserving the paper document as it is and transmits the electronic data to another apparatus. For the reduction of a transmission cost, the computerized document is required to have a high compressibility. Meanwhile, the compression of the electronic data is required to have reusability in which the electronic data can be partially edited and a high image quality capability without degrading image quality even when provided with enlargement or reduction.

However, when a character region and a photograph region are mixed in document data, compression suitable for the character region provides high image quality but a low compression ratio, and compression suitable for the photograph region provides a high compression ratio but has a problem of character image quality degradation (deterioration). Accordingly, a method has been proposed as follows. First, the computerized document data (document image) is separated into the character region and the photograph region, and the character region, where the reusability and high image quality capability are important, is converted into vector data. Then, the other region which is not easily vectorized such as the photograph region is compressed by JPEG and the compression results of the respective regions are synthesized and outputted. This method is proposed to realize the high compressibility, reusability, and high image quality capability for a document image (refer to Japanese Patent Laid-Open No. 2004-265384).

A method is proposed also for handling a graphic region (generally called illustration, clip art, or line art), which is composed of several uniform colors and has a feature of a clear outline, as well as the character region as an object of the vector processing (refer to Japanese Patent Laid-Open No. 2006-344069). The method proposed here reduces the number of colors of an input image by applying color similarity to the input image and subsequently performs functional approximation of an outline of each color region after the extraction thereof to output the vector data with color information added thereto.

For performing the vectorization of a scan image, while it is necessary to reduce a scan noise contained in the input image and to extract an outline of an original image, the number of colors needs to be reduced in preprocessing. When clustering is applied, after the number of colors is squeezed first to some extent by the clustering, a method of performing more accurate color separation has been used by combining clusters having similar colors with each other in post-processing. For example, Japanese Patent Laid-Open No. 2006-344069 proposes a method of eliminating a cluster having the number of pixels smaller than a predetermined threshold value in the result of the clustering.

The illustration sometimes includes a fine (thin) line art region and a strong edge component, and the image processing of such an image causes blurring around these regions and provides an unwanted effect in the succeeding image processing since a color generated by the blurring is different from the color of the input image. Further, originally unnecessary vector data is generated in the region where the blurring has occurred, and resultantly there arises a problem that a vector data size is increased and data reusability is degraded.

Further, a renderer accommodating a vector format sometimes has a lower limit of a line width to be rendered depending on a performance limit of the renderer. When an image containing a fine line-shaped noise is vectorized and outputted in a vector format having the lower limit of a line width to be rendered, there also arises a problem that the line-shaped noise is displayed thicker than it is causing a line to appear blurred and image quality appears to be degraded as shown in FIG. 4. For example, a part of one line image in an original document image is clustered into two parallel line-shaped regions if the part of one line image is scanned as an image including two little different colors, and vector data expressing two neighboring fine lines is generated when each of the line-shaped regions is vectorized. When the line width in this vector data is smaller than the lower limit of the line width to be rendered, the line width is reproduced and displayed to become larger by the rendering and thereby the part including the two lines appears to be thicker as blurred. When displayed in 100% as shown on the left side of FIG. 4, for example, the line width in the vector data is smaller than the line width which can be rendered and thereby the line is displayed as blurred. Note that, when the part appearing as blurred is enlarged in 400%, the part is enlarged to be displayed accurately according to the line width in the vector data and thereby the two lines in the vector data sometimes appear to be the original one line, as shown on the right side of FIG. 4.

SUMMARY OF THE INVENTION

An image processing apparatus according to the present invention comprises: an image input unit inputting a read-out image; a color region dividing unit dividing the input image into color regions; a labeling unit providing an individual label to each of the color regions; a labeled region shape analysis unit obtaining labeled region shape information including information representing a shape feature of a labeled region which is the color region provided with the label; a micro-region determination unit determining whether the labeled region provided with the label is a micro-region or not according to the labeled region shape information obtained by the labeled region shape analysis unit; and a micro-region combining unit combining a region determined to be the micro-region with a neighboring labeled region.

Further, an image processing method according to the present invention comprises: an image input step of inputting a read-out image; a color region dividing step of dividing the input image into color regions; a labeling step of providing an individual label to each of the color regions; a labeled region shape analysis step of obtaining labeled region shape information including information representing a shape feature of a labeled region which is the color region provided with the label; a micro-region determination step of determining whether the labeled region provided with the label is a micro-region or not according to the labeled region shape information obtained by the labeled region shape analysis step; and a micro-region combining step of combining a region determined to be the micro-region with a neighboring labeled region.

The present invention determines the micro-region according to the labeled region shape information representing a shape feature of the labeled region which is divided as the color region and provided with the label. Then, the present invention can combine the determined micro-region with another region, and thereby can solve the problem of color blurring in a fine line art region or around an edge component and can perform color component separation accurately. Accordingly, it is possible to reduce data amount in the vectorization of an illustration and also to improve the reusability of the illustration as a component.

Further features of the present invention will become apparent from the following description of exemplary embodiments (with reference to the attached drawings).

BRIEF DESCRIPTION OF THE DRAWINGS

FIG. 10 is diagram showing an example of carrying out combining processing pixel by pixel.

DESCRIPTION OF THE EMBODIMENTS

<Embodiment 1>

Hereinafter, detailed description will be given with reference to the drawings for color separation processing of an illustration image using an image processing apparatus according to the present invention. Note that a constituent described in this embodiment is only an example, and the technical scope of the present invention is to be defined by the claims and is not to be limited by the following individual embodiment.

Figure 1:
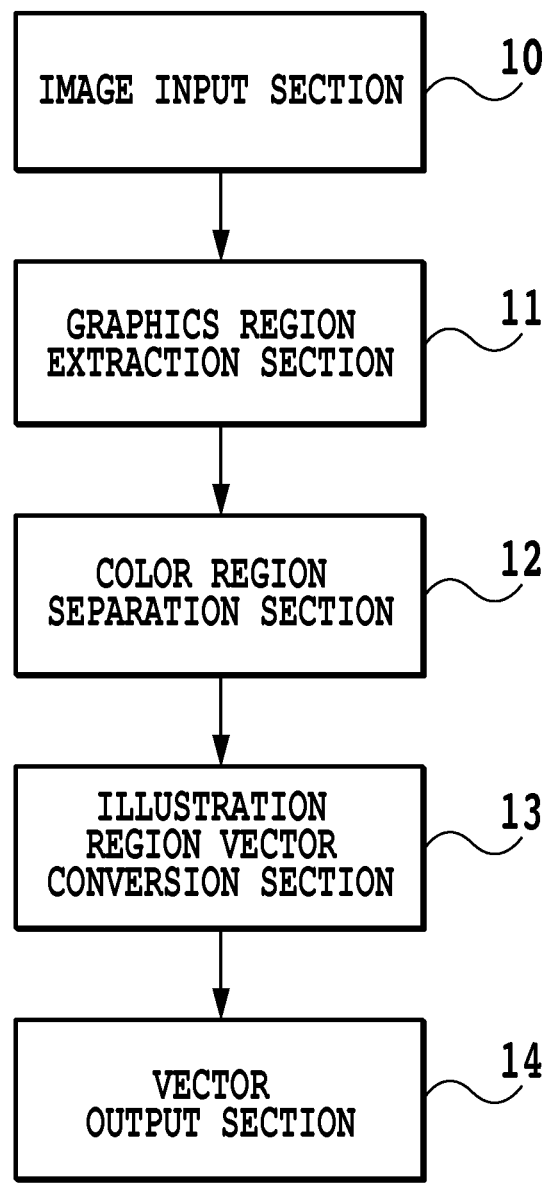
FIG. 1 is a block diagram showing a functional configuration of an image processing apparatus according to Embodiment 1 of the present invention.

FIG. 1 is a block diagram showing a configuration of an image processing apparatus according to an embodiment of the present invention. The image processing apparatus has a function of performing color separation processing in the vectorization processing of an illustration.

In FIG. 1, an image input section 10 accepts the input of monochrome or color image data from paper information via an image read-out section such as a scanner. A graphics region extraction section 11 extracts a graphics region, which has an attribute of neither a character nor a photograph, from the input image. A region having an attribute of a character becomes an object of vectrization and a region having an attribute of a photograph is not the object of vectrization and subjected to compression processing such as JPEG. In the present embodiment, the graphics region extraction section 11 extracts the graphics region which is a region except the region having the attribute of a character or a photograph, and extracts an illustration region which becomes the object of vectrization from this graphics region. A color region separation section 12 divides the illustration region into color components. This color region separation section 12 performs processing which is a feature of the present embodiment. Details thereof will be described below. An illustration region vector conversion section 13 converts the color separation result of the illustration region into vector data. A vector output section 14 outputs the vector data obtained as a result of the processing in the illustration region vector conversion section 13.

Figure 2:
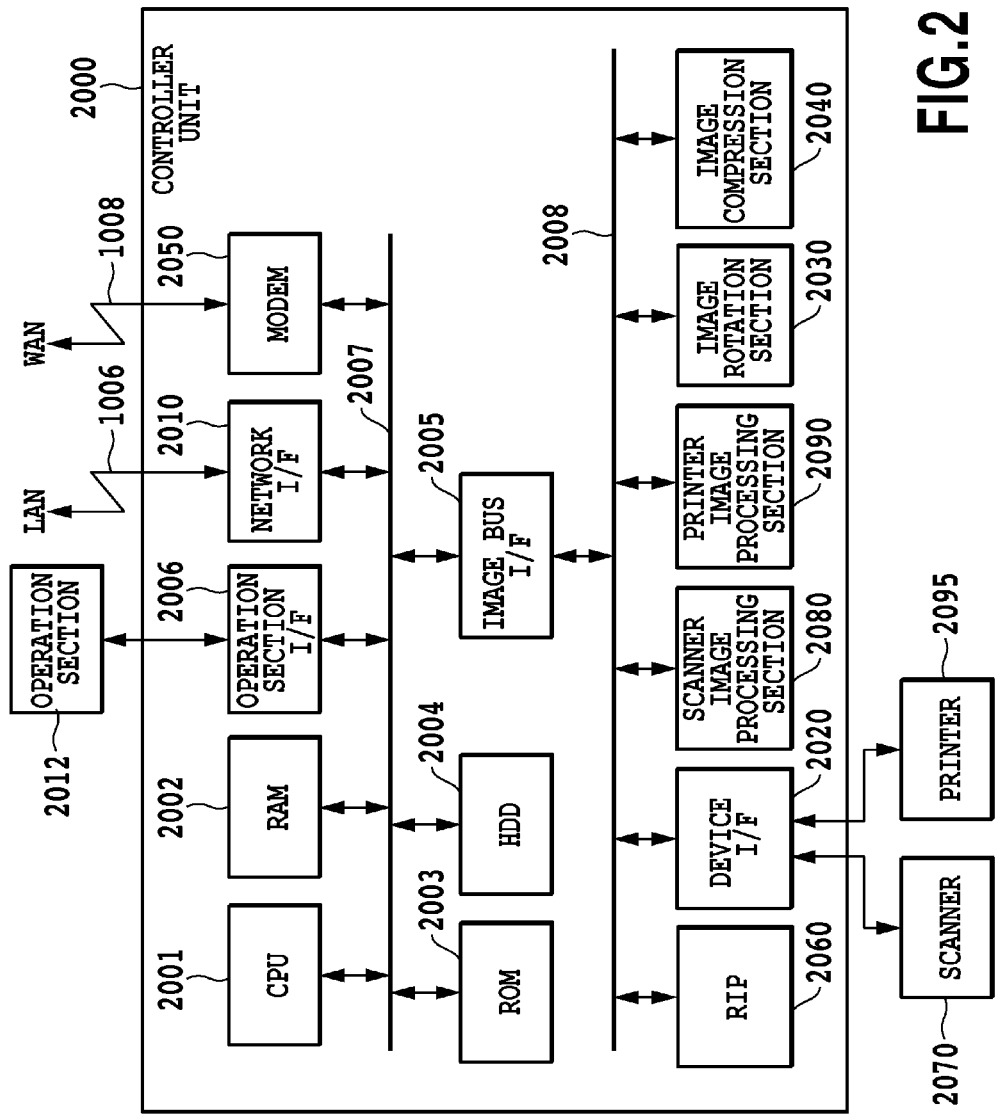
FIG. 2 is a block diagram illustrating a main part configuration of a digital composite machine (MFP) realizing the image processing apparatus shown in FIG. 1.

FIG. 2 is a block diagram showing a main part configuration of a digital composite machine (also called MFP: Multi-Function Peripheral) which is an embodiment realizing the image processing apparatus shown in FIG. 1. Note that the present embodiment uses the digital composite machine (MFP) having a scanner function and a printer function as the image processing apparatus, a system in which a versatile scanner is connected to a personal computer may be used as the image processing apparatus.

As shown in FIG. 2, the MFP is provided with a controller unit 2000 which functions as a unit controlling the image processing apparatus. The controller unit 2000 is connected with a scanner 2070 which is an image input device and a printer 2095 which is an image output device, via a device interface (I/F) 2020. Then, the controller unit 2000 can perform a control for realizing a copy function which prints and outputs image data read-out from a document image by the scanner 2070 using the printer 2095. Further, the controller unit 2000 can perform a control for carrying out input and output of a pattern image, device information, and the like with another apparatus via a LAN 1006 or a public line (WAN) 1008.

The controller unit 2000 has a CPU 2001 as shown in FIG. 2. The CPU 2001 launches an operation system (OS) with a boot program stored in a ROM 2003. Then, the CPU 2001 carries out various kinds of processing by executing an application program stored in an HDD (Hard Disk Drive) 2004 on this OS. A RAM 2002 is used as a work area of the CPU 2001. The RAM 2002 also provides an image memory area for temporarily storing image data as well as the work area of the CPU 2001. The HDD 2004 stores the image data together with the above application program.

The ROM 2003 and the RAM 2002 are connected to the CPU 2001 via a system bus 2007. The CPU 2001 is connected with an operation I/F (interface) 2006, a network I/F (interface) 2010, a modem 2050, and an image bus I/F (interface) 2005.

The operation I/F 2006 is an interface with an operation section 2012 having a touch panel and outputs the image data to be displayed on the operation section 2012 to the operation section 2012. Further, the operation section I/F 2006 transmits information input by a user on the operation section 2012 to the CPU 2001.

Further, the network I/F 2010 is connected to the LAN 1006 and carries out input and output of information with each apparatus connected to the LAN 1006 via the LAN 1006. The modem 2050 is connected to the public line 1008 and carries out input and output of information with another apparatus via the public line 1008.

The image bus I/F 2005 is connected with an image bus 2008 for transmitting the image data to the system bus 2007 in a high speed and works as a bus bridge for converting a data structure. The image bus 2008 is configured with a PCI bus or IEEE1394. On the image bus 2008 are provided a raster image processor (RIP) 2060, the device I/F 2020, a scanner image processing section 2080, a printer image processing section 2090, an image rotation section 2030, and an image compression section 2040.

The RIP 2060 is a processor developing a PDL (Page Description Language) code into a bit map image. The device I/F 2020 is connected with the scanner 2070 and the printer 2095 and performs conversion between a synchronous system and an asynchronous system of the image data. The scanner image processing section 2080 performs correction, modification, and edit processing for the input image data. The printer image processing section 2090 performs printer correction, resolution conversion, and the like for print output image data. The image rotation section 2030 performs the rotation of the image data. The image compression section 2040 compresses multi-value image data into JPEG data and compresses binary image data into the data of JBIG, MMR, MH, or the like, and also performs the decompression processing thereof.

Figure 3:
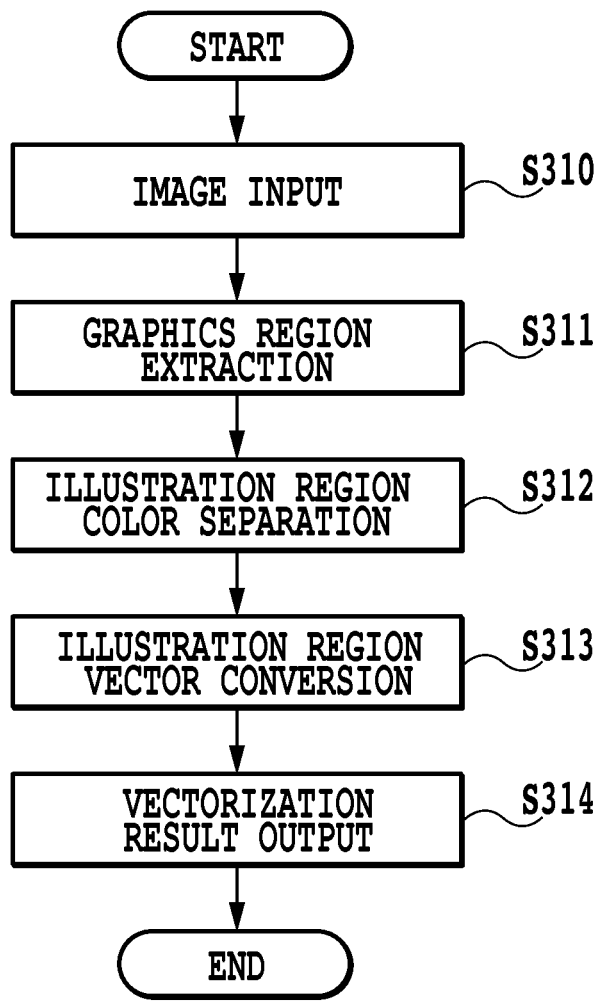
FIG. 3 is a flowchart for explaining an outline of vectorization processing of an illustration region in Embodiment 1.
Figure 4:
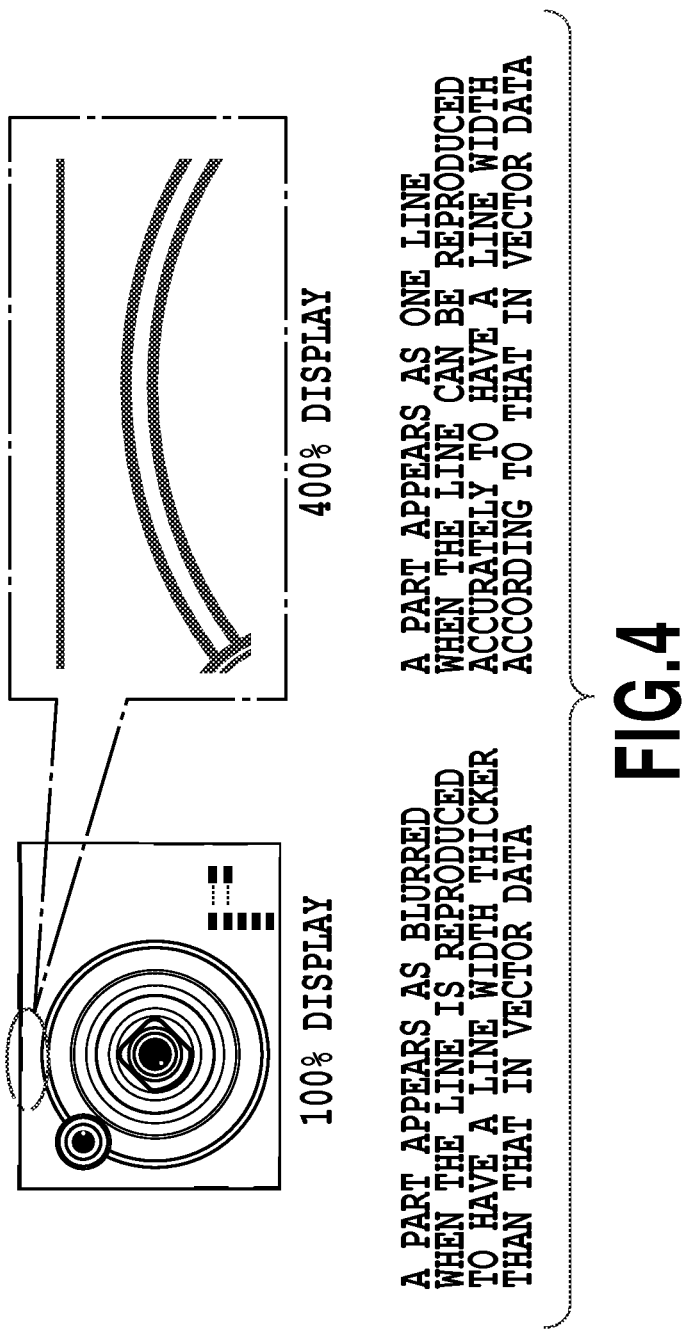
FIG. 4 is a diagram showing a display result when a line is vectorized by a vector format having a lower limit of a line width to be rendered while leaving a fine line-shaped noise region.

FIG. 3 is a flowchart for explaining an outline of illustration vectorization processing in Embodiment 1.

First, the image input section 10 inputs image information from the scanner and obtains color document image data (Step S310). Next, the graphics region extraction section 11 converts the input color document image into binary data and separates this binary image data to extract plural kinds of region of a character, a photograph, a table, and the like. As an example realizing this region separation processing, it is possible to use a region separation technique disclosed in U.S. Pat. No. 5,680,478. Here, the patent publication describes "Method and apparatus for character recognition (Shin-Ywan Wang et al./Canon K.K.)". It is possible to extract the graphics region by selecting a region having an attribute which is not any of a character, photograph, and a table (Step S311). A line art region (graphic region) included in this extracted graphics region is called an illustration region in the present specification.

Next, the color region separation section 12 divides the illustration region into individual color regions according to the information of a color feature of each pixel, connection between the individual regions, and the like (Step S312). This color region dividing processing (color separation processing) of the illustration region will be described below in detail.

Subsequently, the illustration region vector conversion section 13 converts each of the separated color regions into vector data (Step S313). An example of the method realizing this vector processing includes a method of vectorization by extracting an outline of a binary image and selecting the coordinate vector thereof which is described in Japanese Patent Publication No. 2885999, for example.

Lastly, the vector data output section 18 outputs the result of the vectorization (Step S314).

Figure 5:
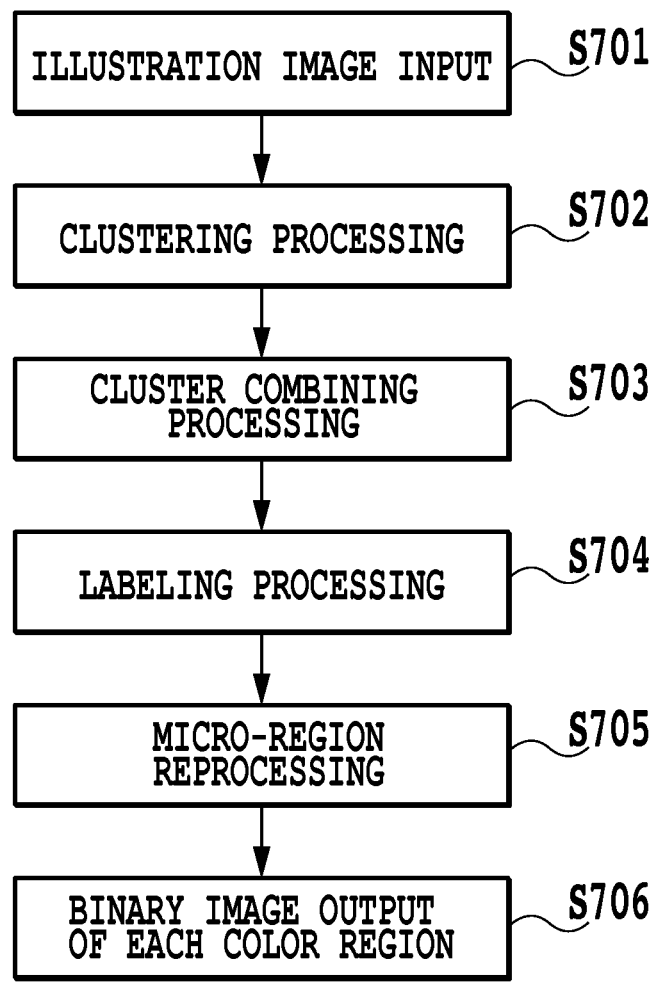
FIG. 5 is a flowchart for explaining illustration region dividing processing.

Details of the illustration region color separation processing (Step S312) will be explained by the use of FIG. 5. First, an illustration image to be processed is input in Step S701. This illustration image is an image of the region having the attribute which is not any of a character, a photograph, and a table, as explained above. Then, the color region separation section 12 carries out clustering processing in Step S702 according to a color feature amount of each pixel of the input illustration image. This processing generates the first cluster by using a pixel located upper left of the image. Then, the color region separation section 12 obtains similarities in the color feature amount to all the clusters for each of all the succeeding pixels by checking the pixels in the order of raster scanning. A higher similarity is considered to indicate that the feature of the focused pixel is close to that of the cluster. While RGB values are used here in the calculation of the similarity, information of another color space or information except the color may be used as the feature amount. Then, the color region separation section 12 temporarily records the highest similarity and a cluster number corresponding to this similarity, and compares this similarity with a preliminarily set threshold value (seventh threshold value). If the similarity is higher than the threshold value, the focused pixel is made to belong to a cluster which has the highest similarity. If the similarity is lower than the threshold value, a new cluster is generated from the focused pixel. This processing is repeated until the processing is completed for all the pixels.

Next, in Step S703, the color region separation section 12 carries out cluster combining processing according to the clustering processing result in preceding Step S702. In this processing, the color region separation section 12 takes out the clusters in the order of smaller number of pixels and searches for the cluster which has the most similar feature information. It is possible to use the RGB values for the similarity calculation by obtaining a color distance between the two clusters. The color region separation section 12 combines both of the clusters when the clusters are considered to be similar to each other and carries out this processing for all the clusters. Thereby, it is possible to group the clusters having the similarity to each other within a predetermined value into one cluster.

Figure 6A:
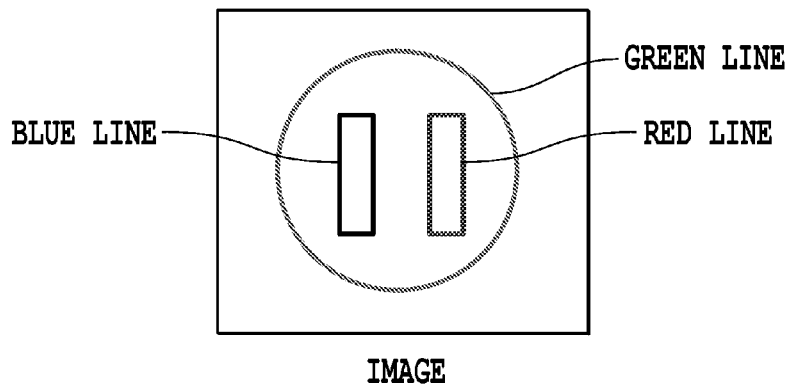
FIG. 6A is a diagram showing an original image of FIG. 6B and FIG. 6C.
Figures 6B, 6C:
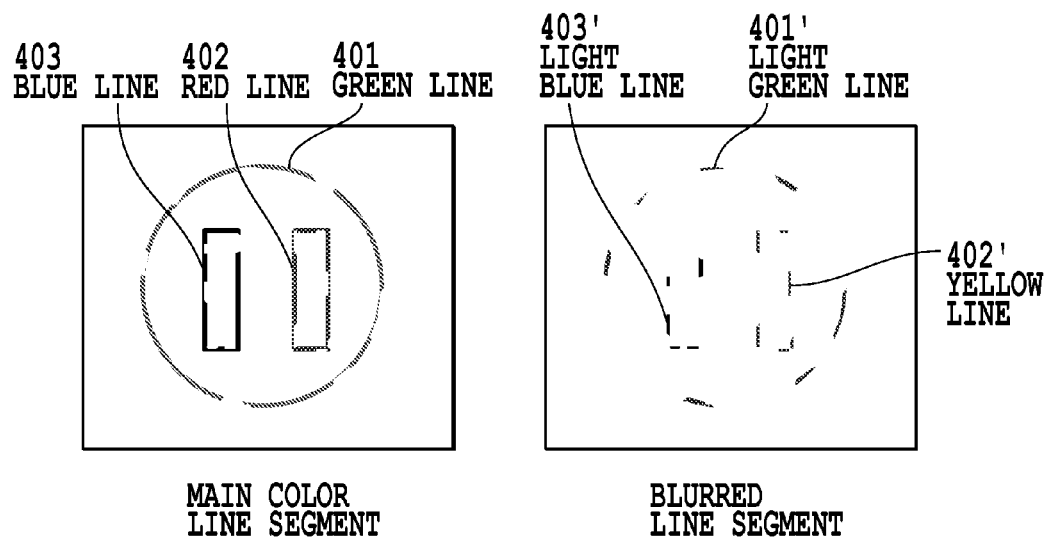
FIG. 6B and FIG. 6C are diagrams showing an example of color blurring in a line art region caused by compression, scanning, or the like in image processing of Embodiment 1.

FIG. 6A is a diagram showing an original image of FIG. 6B and FIG. 6C. FIG. 6B and FIG. 6C are diagrams showing color blurring generated around a fine line or an edge which is caused by compression, scanning, or the like and observed after the cluster combining processing in the image processing of Embodiment 1. The original image is assumed to be an image composed of a green line, a red line, and a blue line as shown in FIG. 6A. When this image is read out by a scanner and subjected to the color reduction processing by the use of the clustering, a green line 401, a red line 402, and a blue line 403 are obtained as main color lines as shown in FIG. 6B. Meanwhile, blurred short lines are sometimes generated in fragments near the main color lines as shown in FIG. 6C; a light green line 401' near the green line 401, a yellow line 402' near the red line 402, and a light blue line 403' near the blue line 403. That is, when scanned, a part of the main line is sometimes determined to be a different color from that of the line 401, 402, or 403 and separated as another line segment 401', 402' or 403'. This separated line segment resultantly increases a size of the vector data and causes blurring in rendering, and also degrades the reusability of the data. Accordingly, it is necessary to combine this region with the main color line in the succeeding processing and to generate an accurate color-individual image.

In Step S704, the color region separation section 12 carries out labeling processing according to the result of the cluster combining processing in preceding Step S703. The labeling processing is processing of classifying the images by providing a number to the pixel group. In this labeling processing, the color region separation section 12 obtains labeled region shape information including connection information (number of labeled regions) indicating the number of labeled regions included in each of the clusters and shape information such as a width of each labeled region and a circumscribed rectangle of each labeled region. Note that the circumscribed rectangle of the labeled region is a rectangle circumscribing the labeled region as shown by the dotted line in FIG. 8, and means a rectangle including the labeled region therein. Each of the labeled regions has the circumscribed rectangle corresponding thereto. Further, the labeled region shape information may include the number of pixels in the labeled region.

Then, in Step S705, the color region separation section 12 processes the labeled region to be reprocessed as a micro-region according to the connection information of each labeled region and the labeled region shape information including the shape feature of each labeled region obtained by the above labeling processing (labeled region shape analysis processing). This micro-region determination processing and combining processing will be explained below in detail. In Step S706, a binary image of each color region is output and the process is terminated. Note that the output binary image is vector-converted and outputted as described above.

Next, the micro-region determination processing and combining processing (reprocessing) shown in Step S705 will be explained. In the micro-region determination processing, the color region separation section 12 first analyzes the shape of the labeled region. The analysis of the labeled region shape is processing of determining a feature such as the number of pixels in each labeled region and whether the labeled region has a line shape or not (line-shaped micro-region determination processing). This processing is performed for detecting a region which is not suitable for the vectorization. A labeled region having an extremely small number of pixels and a labeled region having a line shape correspond to the regions not suitable for the vectorization, and these regions cause problems such as data amount increase, blurring, and edit capability degradation. Each of the labeled region having an extremely small number of pixels and the labeled region having a line shape is generated in the result of the clustering mainly by the influence of a scan noise. Accordingly, it is necessary to determine whether each of these regions can be combined with another labeled region or not and to cause the region to become a processing unit suitable for the vectorization, even when the region is determined to be a color region different from the original color region as a result of the clustering processing.

Note that the number of pixels in the labeled region can be obtained by one raster scanning for the whole image when a spreadsheet is prepared for the label number and the number of pixels in the labeled region corresponding to the number. It is possible to determine whether a focused labeled region is the micro-region or not by comparing the number of pixels in each labeled region with a fifth threshold value after the raster scanning. While the fifth threshold value may be set to be any value, the labeled region having less than five pixels is difficult to confirm visually and seldom causes visual degradation even when combined with another region in the case of an input scan image having a resolution of 300 dpi. Accordingly, the present embodiment assumes that the fifth threshold value is five and determines that the labeled region having the number of pixels smaller than five is micro-sized. For this fifth threshold value, a value varied depending on an input resolution or an input image size may be used. For example, a higher input resolution or a larger input image size increases the upper limit of the number of pixels which does not allow the visual degradation to be detected, and it is preferable to use a larger threshold value in this case.

Figure 8:
FIG. 8 shows a labeled region to be subjected to line shape determination and an example of extracted information.

Here, the following method is considered as the determination method determining whether the labeled region is the line-shaped micro-region or not. A labeled region shown in FIG. 8 is explained as an example. It is assumed that the horizontal width and vertical width in a circumscribed rectangle of this labeled region are 100 pixels and 15 pixels, respectively, and the number of pixels in the labeled region is 150 pixels, and it is assumed that the number of pixels located at the boundary between a black labeled region and a white labeled region (boundary length) is 200 pixels.

For example, a first determination method obtains a ratio of a side length in one direction to a side length in the other direction (e.g., ratio of the long side length to the short side length in the circumscribed rectangle) and, when the ratio is larger than a first threshold value, determines that the circumscribed rectangle has a long shape and the labeled region is line-shaped. When the first threshold value is five, for example, (Longitudinal length of a circumscribed rectangle (100))/(Other circumscribed rectangle length (15))=6.67, and it is possible to determine that the labeled region is line-shaped, since the ratio is larger than the threshold value of five.

A second determination method uses a ratio between the area of the circumscribed rectangle and the number of pixels in the labeled region. This method obtains a ratio of the area of the circumscribed rectangle to the number of pixels in the actual labeled region and, when the ratio is not less than a second threshold value, it is determined that the number of pixels in the labeled region occupying the circumscribed rectangle is small and the labeled region is line-shaped. When the second threshold value is seven, for example, (Circumscribed rectangle area (1500))/(number of pixels in a labeled region)=10, and it is possible to determine that the labeled region is line-shaped, since the ratio is larger than the threshold value of seven.

A third determination method uses a ratio of the number of pixels located at a boundary between the labeled regions (boundary length) to the number of pixels in the labeled region. This method obtains a ratio of the length of a boundary with the other labeled region (periphery length) to the number of pixels in the labeled region. When the ratio is not less than a third threshold value, it is determined that the focused labeled region is line-shaped. When the third threshold is 1.0, for example, (Number of pixels in a boundary with the other labeled region (200))/(Number of pixels in a labeled region (150))=1.33, and it is possible to determine that the labeled region is line-shaped, since the ratio is larger than the threshold value of 1.0.

Figure 7:
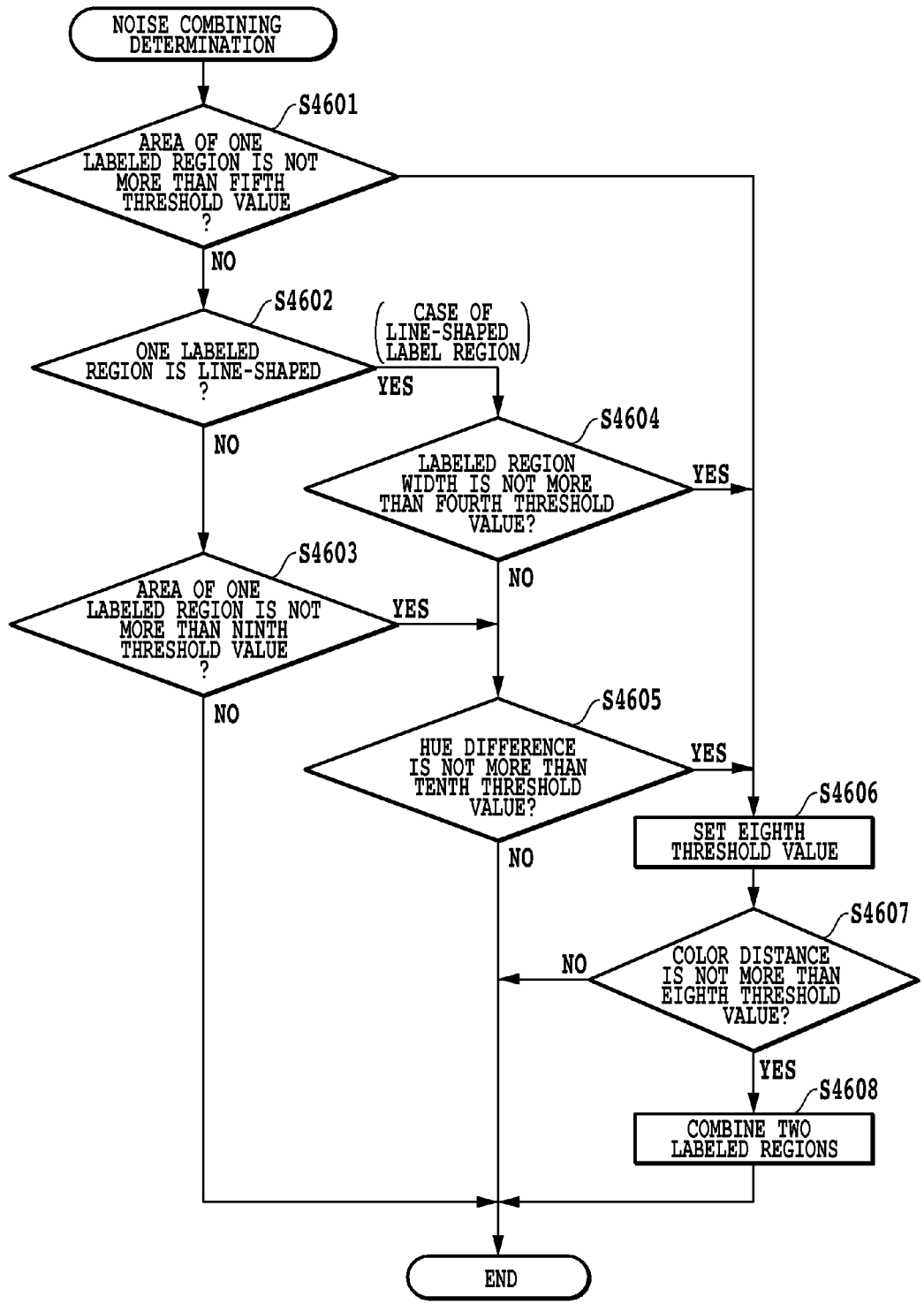
FIG. 7 is a flowchart for explaining reprocessing of a micro-region.

After having determined the micro-region as described above, the color region separation section 12 carries out the combining processing of the micro-region. The flow of the micro-region combining processing is shown in FIG. 7. A micro-region combining unit determines whether to combine the neighboring two labeled regions or not by using information representing the previously determined micro-region and similarity between both of the labeled regions. The present embodiment uses color distance in the RGB color space and hue in the HSV color space for an index of the similarity. First in Step S4601, the combining unit determines whether or not one of the labeled regions is the micro-sized having the number of pixels not more than the fifth threshold value. When the micro-sized is determined to be included in one of the labeled regions, the process goes to Step S4606 and a threshold value (eighth threshold value) is set for the color distance between the two regions. Such a labeled region remaining as the micro-sized is considered to be an isolated point which is caused by the scan noise and surrounded by a background cluster. Accordingly, it is possible to eliminate the scan noise by setting the eighth threshold value to be looser. That is, when the number of pixels in one of the labeled regions is not more than the fifth threshold value in Step S4601, the combining unit determines whether to combine the labeled regions by comparing the color distance between the two labeled regions with the eighth threshold value in Step S4607 without checking a hue difference.

When having determined that the areas of both labeled regions are larger than the fifth threshold value in Step S4601, the combining unit confirms whether at least one of the labeled regions is line-shaped or not in Step S4602. When one of the labeled regions is line-shaped, the process moves to Step S4604 When both of the labeled regions are not line-shaped, the process moves to Step S4603.

In Step S4603, the combining unit checks whether the number of pixels in at least one of the labeled regions is not more than a ninth threshold value. This is performed for preventing a labeled region having large number of pixels from being combined. When both of the labeled regions have the number of pixels larger than the ninth threshold value, the determination processing is terminated without carrying out the labeled region combining processing. On the other hand, when the number of pixels in one of the labeled regions is not more than the ninth threshold value, the process moves to Step S4605.

In Step S4604, the combining unit determines whether the width of the labeled region determined to be line-shaped is not more than a fourth threshold value which is determined by an output format. The fourth threshold value is determined according to a lower limit (minimum value) of a line width to be rendered. When the labeled region having a line width smaller than the lower limit of a line width to be rendered is vectorized and the data after the vectorization is displayed by a renderer, the focused labeled region is not displayed in an accurate line width and this causes image degradation. Accordingly, when the line width of the line-shaped labeled region is not more than the fourth threshold value, the combining unit omits Step S4605 confirming the hue difference and sets the color distance threshold value (eighth threshold value) for combining the labeled regions with each other to be looser in Step S4606. Thereby, the focused line-shaped labeled region becomes easy to combine.

Note that, when the labeled region has a line width of one or two, the length of the boundary (outline) of the labeled region is not less than the number of pixels in the labeled region. Accordingly, when the fourth threshold value is two, the determination can be carried out in a high speed as follows. That is, when a ratio between the length of the labeled region boundary to the number of pixels in the labeled region (labeled region boundary length/number of labeled region pixels) is larger than one, it is determined that the line width of the labeled region is two or less. Further, when the fourth threshold value is three or more, the combining unit obtains the line width of each labeled region by obtaining outline distance of the labeled region and can use the line width for the determination in Step S4604. In this manner, it is possible to improve image quality in the rendering of the vector data by setting the fourth threshold value according to the output vector format and causing the labeled region having a width not more than the threshold value to be easily combined to another region as a noise component.

In Step S4605, the combining unit checks the hue difference between the focused two labeled regions. It is possible to obtain the hue difference by converting the color space of the labeled region of the focused pixel into the HSV color space and referring to H values. When this difference is not more than a tenth threshold value, the process goes to Step S4606.

When the H values referred to at this time indicate that both of the labeled regions have colors close to black, it is possible to set the eighth threshold value used in the succeeding determination of the color distance to be looser in Step S4606. This is because the color distance between the black images tends to be determined to be longer and it is necessary to set the threshold value to be looser for combining the images with each other the same as the other color images. Whether both of the labeled regions have colors close to black or not can be determined by checking whether the H values of both labeled regions are not more than the ninth threshold value or not. Note that, when the hue difference is determined to be larger than the tenth threshold value in Step S4605, the determination processing is terminated without carrying out the labeled region combining processing.

In step S4607, the color distance is checked between the two focused labeled regions. The color distance can be obtained by the use of the RGB Manhattan distance (city block distance) or Euclid distance. When this color distance is not more than the eighth threshold value, both of the labeled regions are combined with each other in Step S4608. The combining processing is carried out by the processing of overwriting the label number of the labeled region having a smaller number of pixels by the label number of the labeled region having a larger number of pixels and updating the shape information regarding the labeled region.

Figure 9:
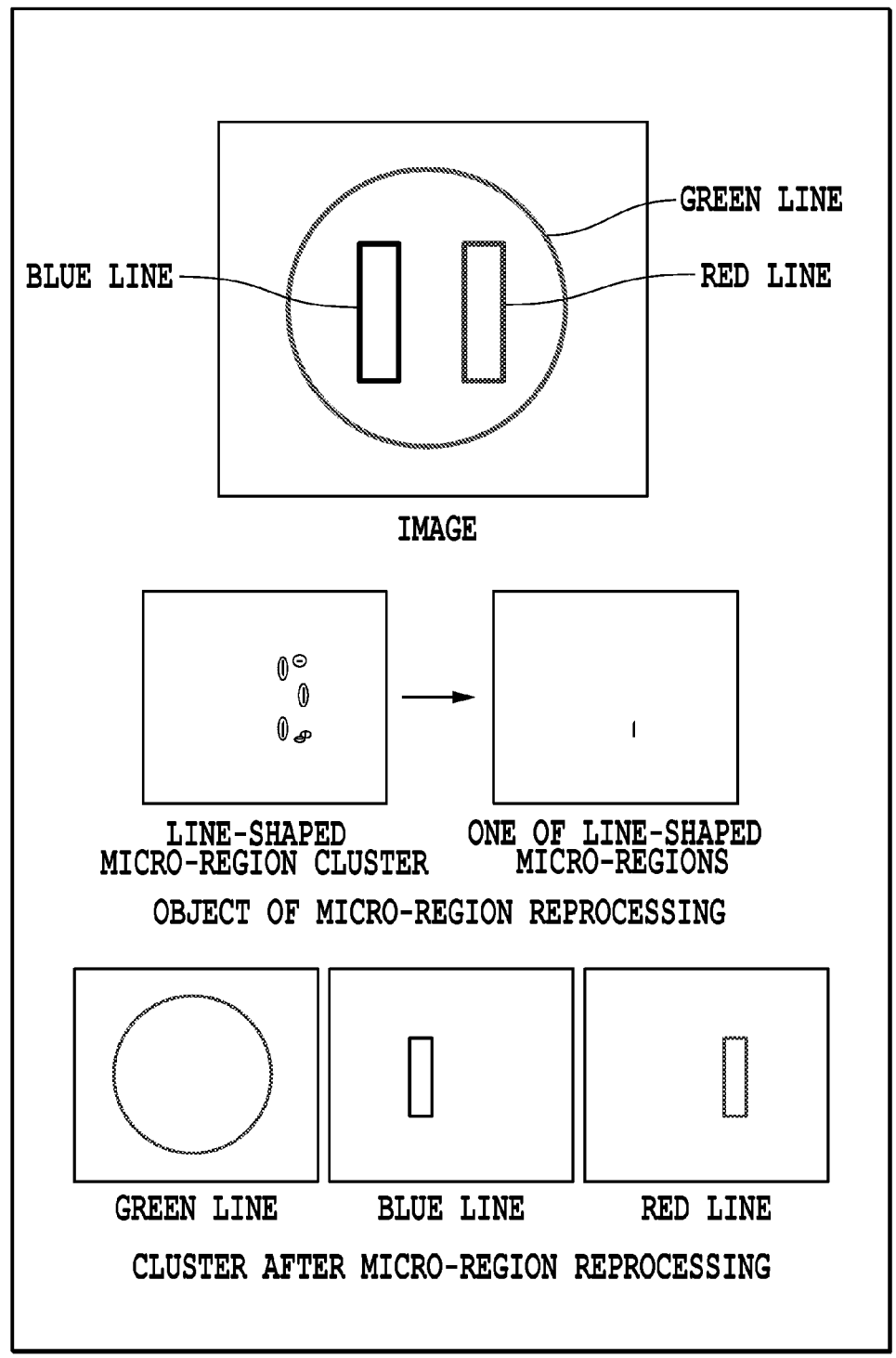
FIG. 9 shows an example of carrying out combining processing of a micro-region in image processing of Embodiment 1.

FIG. 9 shows a result of the micro-region combining processing in the image processing of Embodiment 1. Each of the line-shaped micro-regions is put into the red line region having positional proximity, and it becomes possible to separate the image into three well-arranged color regions of a green line, a blue line and a red line.

As explained above, by the present embodiment, it becomes possible to separate the blurring caused by compression, scanning, or the like into a beautifully-arranged color regions. Thereby, the vectorization result is improved and it becomes possible to improve the compressibility or the reusability of a document image.

<Embodiment 2>

While, in the case of selecting a combination destination of the labeled region, Embodiment 1 shows an example of carrying out the combining when the labeled region satisfying the combining condition is found first, the scope covered by the present invention is not limited to this example. For example, it is optional to confirm whether the neighboring labeled regions can be combined with each other or not for all the combinations of the labeled regions and to preferentially combine the labeled regions having the shortest color distance therebetween with each other. While this method needs a long processing time compared to the method described in Embodiment 1, the method can generate a more accurate color individual image.

Further, when the focused labeled region has a line shape, the labeled region suitable for the connection destination is frequently in contact with an end point. Accordingly, it is optional to combine the labeled regions having the shortest color distance therebetween with each other among the labeled regions connected to the end point of the focused labeled region.

<Embodiment 3>

The above Embodiment 1 or Embodiment 2 combines the focused region with the neighboring labeled region satisfying the condition. Embodiment 3 carries out the determination considering whether or not the combination destination labeled region is the labeled region composing the main color (main color region) as the condition for determining the combining. Whether the labeled region composes the main color or not may be determined by checking whether or not the number of pixels in the combination destination labeled region is larger than a sixth threshold value in step S4608 of FIG. 7. When satisfying this condition, the destination labeled region is determined to be the main color region, and the combining processing is carried out for the two labeled regions.

<Embodiment 4>

In the above Embodiments 1 to 3, the reprocessing of the line-shaped micro-region combines a unit of each line-shaped micro-region, that is, each labeled region to a neighboring cluster. The present embodiment recombines each pixel in the line-shaped micro-region to the main color cluster in a pixel unit in the reprocessing of the line-shaped micro-region. By carrying out the combining processing in a pixel unit it is possible to perform the color separation processing while keeping a shape close to that in the original image of an input image.

"A" of FIG. 10 shows three labeled regions of a white labeled region, a gray labeled region, and a light gray labeled region having the number of pixels smaller than the fifth threshold value. An example of performing the combining processing sequentially pixel by pixel focuses on positions each marked by a black circle in the figure, checks the situation of the peripheral labeled regions, and combines the pixels in a pixel unit to the labeled region having the largest ratio. "A" of FIG. 10 is assumed to be a state before the processing, and "A" to "C" of FIG. 10 show that the ratio of the white labeled region is the largest when the region neighboring the pixel marked by the black circle is referred to. Accordingly, the pixel marked by the black circle is sequentially replaced by the white labeled region. In "D" of FIG. 10, the ratio of the gray labeled regions becomes larger and the pixel is replaced by the gray labeled region. Such processing can finally provide the image shown in "E" of FIG. 10.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-156974, filed Jul. 1, 2009, which is hereby incorporated by reference herein in its entirety.

What is claimed is:

1. An image processing apparatus, comprising:
   an image input unit configured to input an image;
   a color region dividing unit configured to divide the input image into color regions respectively corresponding to different color features;
   a labeling unit configured to label each of the color regions;
   a labeled region shape analysis unit configured to obtain shape information representing a shape feature of a labeled color region obtained by the labeling unit;
   a determination unit configured to determine whether or not the labeled color region is a predetermined shape based on the obtained shape information; and
   a combining unit configured to combine the labeled color region which is determined to have the predetermined shape with a neighboring labeled color region,
   wherein the determination unit determines that for a rectangle circumscribing the labeled color region, when a ratio of a length of a side in one direction to a length of a side in the other direction is larger than a threshold value, the labeled color region has the predetermined shape.

2. The image processing apparatus according to claim 1, wherein
   the image input unit includes a region extraction unit extracting a graphics region from the input image, and
   the color region dividing unit divides the graphics region into the color regions.

3. The image processing apparatus according to claim 1, wherein
   the color region dividing unit determines that a labeled region having the number of pixels larger than a color region threshold value is a main color region, and
   the combining unit selects the a labeled region as a combination destination from main color regions.

4. The image processing apparatus according to claim 1, further comprising a vectorization unit vectorizing image data obtained as a result of the combining unit.

5. The image processing apparatus according to claim 1, wherein the combining unit combines the labeled color region determined to have the predetermined shape with a first found region satisfying a combining condition.

6. The image processing apparatus according to claim 1, wherein the combining unit combines the labeled color region determined to have the predetermined shape with a region which has the shortest color distance therefrom among the regions satisfying a combining condition.

7. The image processing apparatus according to claim 1, wherein the combining unit combines a region connected to an end point of the labeled color region determined to have the predetermined shape among regions satisfying a combining condition for processing the labeled color region determined to have the predetermined shape.

8. The image processing apparatus according to claim 1, wherein the combining unit switches the labeled region of combination destination for each pixel.

9. The image processing apparatus according to claim 1, wherein the labeled region shape analysis unit obtains at least one information set among information sets of the number of pixels, a width, and a circumscribing rectangle.

10. An image processing apparatus, comprising
    an image input unit configured to input an image;
    a color region dividing unit configured to divide the input image into color regions respectively corresponding to different color features;
    a labeling unit configured to label each of the color regions;
    a labeled region shape analysis unit configured to obtain shape information representing a shape feature of a labeled color region obtained by the labeling unit;
    a determination unit configured to determine whether or not the labeled color region has a predetermined shape based on the obtained shape information; and
    a combining unit configured to combine the labeled color region which is determined to have the predetermined shape with a neighboring labeled color region,
    wherein the determination unit sets, as a threshold value, the smallest width of a labeled region which is determined according to at least one information set of an output format type, an input image size, and an input image resolution, and determines that the labeled region having a width not more than the threshold value has the predetermined shape.

11. An image processing method, comprising:

an image input step of inputting an image;

a color region dividing step of dividing the input image into color regions respectively corresponding to different color features;

a labeling step of labeling each of the color regions;

a labeled region shape analysis step of obtaining shape information representing a shape feature of a labeled color region obtained in the labeling step;

a determination step of determining determining whether or not the labeled color region has a predetermined shape based on the obtained shape information; and a combining step of combining the labeled color region which is determined to have the predetermined shape with a neighboring labeled color region, wherein the determination step includes determining that for a rectangle circumscribing the labeled color region, when a ratio of a length of a side in one direction to a length of a side in the other direction is larger than a threshold value, the labeled color region has the predetermined shape, and wherein at least one of the steps is performed by a computer.

12. A non-transitory computer-readable recording medium storing an executable program causing a computer to execute an image processing method according to claim 11.

\* \* \* \* \*